US008738772B2

United States Patent
Erb

(10) Patent No.: US 8,738,772 B2
(45) Date of Patent: May 27, 2014

(54) REGULATING USE OF A MOBILE COMPUTING DEVICE FOR A USER AT A SELECTED LOCATION

(75) Inventor: Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 88 days.

(21) Appl. No.: 13/068,140

(22) Filed: May 2, 2011

(65) Prior Publication Data

US 2012/0284325 A1 Nov. 8, 2012

(51) Int. Cl.
 *G06F 15/173* (2006.01)
(52) U.S. Cl.
 USPC ........... 709/225; 709/229; 709/228; 455/418; 455/419; 455/456.1; 455/456.4
(58) Field of Classification Search
 USPC ................ 455/419, 418, 456.1, 456.4; 726/3; 703/23; 345/156; 709/225, 229, 228
 See application file for complete search history.

(56) References Cited

U.S. PATENT DOCUMENTS

| 2010/0317336 | A1* | 12/2010 | Ferren et al. | 455/419 |
| 2011/0195699 | A1* | 8/2011 | Tadayon et al. | 455/418 |
| 2011/0237274 | A1* | 9/2011 | Wong et al. | 455/456.1 |
| 2011/0239274 | A1* | 9/2011 | Heffez | 726/3 |
| 2011/0257958 | A1* | 10/2011 | Kildevaeld | 703/23 |
| 2011/0316769 | A1* | 12/2011 | Boettcher et al. | 345/156 |

OTHER PUBLICATIONS

Nikolai Kambrock: "Modellierung standortabhangiger Zugriffskontrollen fur mobil unterstutzte Prozesse" Forschugsinstitut fur Rationalisierung an der RWTH Aachen; Sep. 1, 2007.
Alexander Mertens: "Metamodell eines simoKIM-Workflows and Prototyp eines simoKIM Workflow-Editors" www.simokim.de/web/guest/publikationen; Dec. 12, 2008.
Hong Zhan et al: "Spacial context in role-based access control" Information Security and Cryptology ICISC 2006; Jan. 1, 2006 pp. 166-178; vol. 4296/2006—Internet.
Indrakshi Ray et al: "LRBAC: A location-aware role-bsed access control model" International Conference on Information Systems Security: Jan. 1, 2006—Internet.

* cited by examiner

*Primary Examiner* — Le H Luu

(57) ABSTRACT

A system and method for regulating use of a mobile computing device is disclosed. The method comprises identifying a location of the mobile computing device. A role of the user at the identified location is determined. Predetermined limitations are classified for the mobile computing device based on the role of the user at the identified location. A functionality of applications operating on the mobile computing device is regulated based on the predetermined limitations while the mobile computing device is at the identified location.

17 Claims, 2 Drawing Sheets

REGULATING USE OF A MOBILE COMPUTING DEVICE FOR A USER AT A SELECTED LOCATION

BACKGROUND

The rapid development of mobile phones and other types of computing devices has significantly enhanced people's ability to communicate. Many people choose to communicate with others throughout the day via telephone, text messaging, and social networking. The omnipresent ability to communicate has provided many benefits, including an increase in productivity and socialization.

However, as often happens when rapid technological advances occur, the social norms for communicating have not kept up with the ability to communicate. The ability to communicate around the clock or otherwise use a mobile computing device at substantially any location does not necessarily infer that it is proper to do so. Mobile computing devices can often cause disruptions in conversations, meetings, classrooms, and social activities as phone calls, voice mail, and text message alerts are received. These disruptions can reduce the effectiveness and interrupt the flow of the environment in which they occur.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
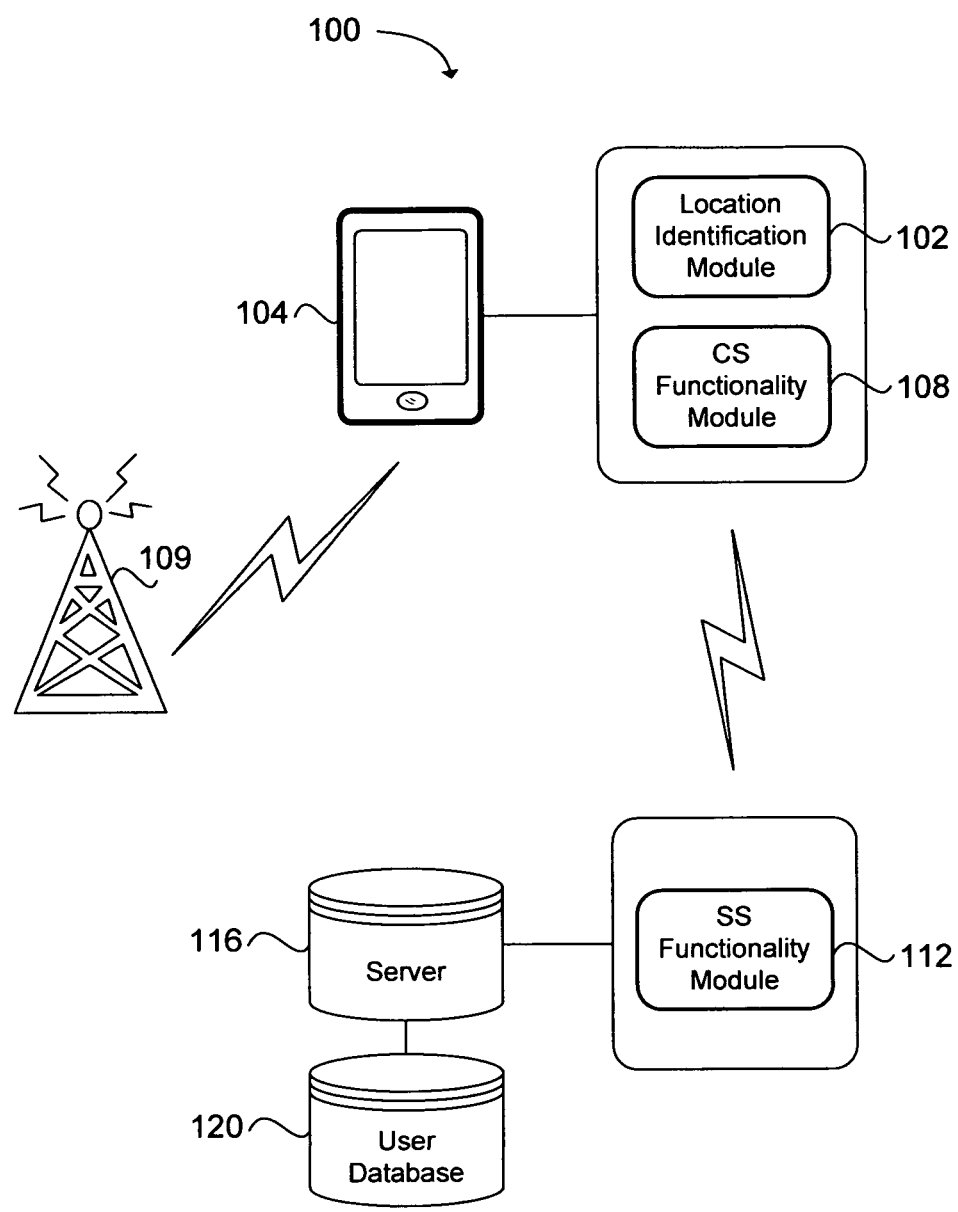
FIG. 1 illustrates an example diagram of system for regulating use of a mobile computing device for a user at a selected location in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile computing devices can be an important tool for learning and productivity. However, they can also be a considerable distraction. The use of mobile computing devices in enclosed environments, such as a class room setting, a business meeting, or a social setting such as a party, a playhouse, or a movie theater, can interrupt the flow of the environment in which they occur.

For instance, important meetings, movies, plays, and other types of events may be interrupted repeatedly by telephone calls, voice mail, and text message alerts. Educational environments such as a formal classroom or informal teaching environments such as a board room can also be disturbed by alerts from mobile computing devices. Moreover, those attending a meeting or educational seminar can receive a reduced benefit of the educational instruction caused by distractions offered by the mobile computing devices, such as email, games, internet access, and so forth.

To enable mobile computing devices to be used to enhance productivity, while reducing potential deleterious effects such as unwanted audio alerts and other types of distractions, a mobile computing device can be configured to identify a location of the device, identify a role of a user of the device, and apply predetermined limitations that can regulate a functionality of applications operating on the mobile computing device while the mobile computing device is at the identified location. By determining a role of the user, the limitations can be tailored for specific types of users. For instance, a school teacher or a corporate executive can have different types of limitations applied to their mobile computing devices than the limitations that may be applied to the mobile computing device of a student or a new employee.

In addition to a user's role, the tailored limitations for a user's mobile computing device can be dependent on both time and place, thereby limiting the intrusiveness of the limitations. For instance, the limitations may only apply during business or school hours. After hours, the limitations may either be completely lifted, or less intrusive limitations can be applied. In addition, when a user exits a predefined location, such as a class room, a board room, or a building, the user's mobile computing device can be configured to remove the tailored limitations, thereby enabling the mobile computing device to operate in a standard, unrestricted manner.

A mobile computing device, as used herein, can be a mobile phone device such as a smart phone, a tablet computing device, a laptop computer, a multimedia device such as an IPod Touch®, or another type of mobile computing device.

FIG. 1 provides one example illustration of a system 100 for regulating use of a mobile computing device for a user at a selected location. The system comprises a location identification module 102 configured to identify a location of a mobile computing device 104. The location identification module may be configured to operate on the mobile computing device. For instance, the mobile computing device may include a Global Positioning System (GPS) receiver configured to provide a location of the mobile computing device. The location identification module can receive location information from the GPS receiver to identify a location of the mobile computing device.

Alternatively, the location identification module 102 may be configured to identify a location of the mobile computing device 104 based on signals transmitted and/or received by the mobile computing device. For instance, a location of the mobile computing device can be determined based on a wireless connection to which the mobile computing device connects to. The mobile computing device may connect to a local wireless router, such as an Institute of Electrical and Electronics Engineers 802.11 wireless router. The router can be identified using information such as the router's Media Access Control (MAC) address of the router. A map or database containing the location of each router at a specific location or locations can be created. The map or database can be used to determine a location of the router at the specific location, and therefore, a location of the mobile computing device connected to a specific router. The location identification module can communicate with the mobile computing device or the wireless router to determine a location of the mobile computing device.

In another embodiment, the mobile computing device 104 can connect to one or more cellular type radio stations 109. A location of the mobile computing device 104 can be triangulated based on a communication between the mobile computing device and multiple cellular towers, as can be appreciated. The location identification module 102 can receive location information based on the triangulation location information to determine a location of the mobile computing device.

In another embodiment, the location identification module 102 can identify a location of the user of the mobile computing device 104 to identify a location of the mobile computing device. For instance, many businesses have identification badges that are used to allow access to buildings and rooms within buildings. Each time a badge communicates with a badge receiver, the location of the person can be associated with the location of the badge receiver. This information can then be communicated from a server that is in communication with the badge receiver to the mobile computing device via a wired or wireless connection, such as an 802.11 "WiFi" wireless connection or another type of wireless connection, as can be appreciated. The location identification module can use this information to identify an approximate location of the mobile communication device based on where the user's badge communicated with a badge receiver.

The functionality of the mobile computing device can be regulated through the use of a client side functionality module 108 and a server side functionality module 112. The client side functionality module can be configured to operate on the mobile computing device 104. The client side functionality module may be downloaded via wired or wireless means. For instance, when a user of a mobile computing device enters a specific area, such as a school building or a business conference room, the user can receive a WiFi connection from a router located at the specific location. In order to use the WiFi, the user may be prompted to first download the client side functionality module onto the mobile computing device.

Each mobile computing device 104 can be registered to operate at the specific location. The mobile computing device can be registered via the client side functionality module 108 operating on the mobile computing device. Alternatively, another computing device that is in communication with the server 116 can be used to register the mobile computing device. Once the registration process has been completed, the mobile computing device can be recognized each time it enters the specific location. The mobile computing device can be recognized by a destination address, MAC address, Internet Protocol (IP) address, or another type of identification process. When the mobile computing device leaves the selected area, based on information from the location identification module 102, then the client side functionality module can deregister the mobile computing device.

The server side functionality module 112 can operate on at least one server 116 that is in communication with the mobile computing device 104. As previously discussed, the server can communicate with the mobile computing device through a combination of a wired and/or wireless networks. In one embodiment, the server 116 can be a communications server. The server can be configured to operate communications software such as Mitel Communications Director. The communications software can be configured to operate Dynamic Extension Support.

The mobile computing device 104 can be configured to communicate with a server having a user database 120. The user database can be located on the same server 116 on which the client side functionality module 108 is located or a separate server. The user database is configured to identify a role of the user of the mobile computing device. Each role can be assigned selected permissions.

The term permissions, as used herein, refers to a rule set identifying which applications can operate on the mobile computing device. Alternatively, the permissions may select which applications will be temporarily blocked from use on the mobile computing device while the device is operating at an identified location. The term "application" is defined as a program running on a mobile computing device. Applications can include programs such as an internet browser, an email program, a game, a word processor program, a spread sheet program, and the like. The term "application" can also refer to programs used to control operations on a mobile computing device. For example, a program used to enable or disable receiving text messages, phone calls, and the like, as well as control of the functionality of the mobile computing device, such as placing the mobile computing device in a "silent mode" in which all audio alerts are muted.

In one embodiment, a user can download the client side functionality module 108 onto the user's mobile computing device 104. The client side functionality module can include a graphical user interface that enables the user to select the user's roll. Alternatively, the user can enter this information from another computing device that is in communication with the user database.

In another embodiment, the user may already be identified in the user database 120. In this instance, the user may be identified by entering credentials, such as the user's username and password. Another type of credentials may be the user's student identification number or employee number assigned by the user's school or employer. The user can enter the appropriate credentials in a graphical user interface. The user database can be associated with the user's credentials to identify the user's role based on the credentials. For instance, a user may enter a student number and the user database can be used to identify that the user is a student. A teacher can enter an identification number that associates the teacher's device with a role of teacher. An employee may enter an employee identification number that associates the employee's mobile computing device with the role of the employee at a business. The client side and server side functionality modules 112, 108 for each user can then be setup based on the user's role.

In addition to regulating the use of applications on the user's device, the client side and server side functionality modules 112, 108 can be configured to confer rights to a user to adjust the permissions granted to the user by the functionality modules. For example, a teacher may have the right to actively adjust selected permissions such as the ability to receive phone calls, email, or texts for a selected time period. The teacher may not have the right to change permissions for other features, such as the internet sites that are filtered while in a school. The actual permissions that can be changed by each role can be selected by each entity using the system 100 for regulating use of a mobile computing device for a user at a selected location.

In another embodiment, a user can be allowed to change the set permissions of one or more other users. For instance, a teacher may be giving a presentation in class and desire to show the students in the class a video on YouTube®. The permissions normally granted to the mobile computing devices used by the students during school may typically be set to deny the use of YouTube during school time while the students are in school. The user database 120 can be configured to include information regarding the classes that the students attend. The teacher can use a graphical user interface to communicate (not shown) with the server side functionality module 112 and adjust predetermined limitations regarding the functionality of the students' mobile computing devices 104 in the selected class during the class time. The graphical user interface may be accessed by the teacher using the teacher's mobile computing device. Alternatively, a computing device such as a desktop computer that is connected to the school network may be used to access the server side functionality module 112.

In this example, the teacher may use the graphical user interface to select Mrs. Smith's $3^{rd}$ period geography class and set the permissions so that the students in the class have permission to view YouTube® videos on their mobile computing devices 104 during that time period while they are in her class room. The permission may be more broadly granted, allowing the students to use a web browser on their mobile computing device to access the internet to view the desired video. The teacher can use the graphical user interface to spontaneously change the permissions of the students' mobile computing devices while teaching the class. Alternatively, the permissions for the selected class may be set prior to the class, allowing the student's access only during that selected time while they are in the classroom.

Once the teacher has updated the permissions for the students in the 3.sup.rd period geography class, the server side functionality module 112 can wirelessly communicate with the client side functionality module 108 on each mobile computing device operated by students that are registered for Mrs. Smith's $3^{rd}$ period class. The communication can update the set permissions on the client side functionality module operating on the students' mobile computing devices. The students can then view the desired video during that time period while they are in the selected classroom. After the time period, the client side functionality module can return to grant a predetermined set of permissions. In addition, if the students leave the classroom during the time period, the client side functionality module may receive information from the location identification module 102 and reset any granted permissions for the selected classroom.

As previously discussed, the location identification module 102 can determine when the students are in the classroom using any number of identification means, including GPS, triangulation, or a connection to a specific wireless server functioning in or near the class room. In one embodiment, the location identification module can be sufficiently accurate that it can be determined when a person is in a specific room in a specific building. In another embodiment, the accuracy may not be sufficient to provide room by room granularity. For example, the student may have to walk several classrooms away from the $3^{rd}$ period geography class before changing to a different wireless server, thereby enabling the location identification module to determine that the student is no longer in the classroom. The same lack of granularity may occur when using GPS or wireless triangulation to determine a location of a person. However, the ability to set limitations using both time and location can provide sufficient granularity for most types of use.

Any time a person within a selected location, such as the school building, wants to communicate using a short range wireless communication standard such as WiFi, the mobile computing device can be configured to require the client side functionality module to first be downloaded. When a guest enters the selected location and attempts to use the WiFi, the guest can download the client side functionality module and register as a guest. A guest credential may need to be obtained. For instance, the front office may supply the guest credential. The guest credential can provide limits to the person's mobile computing device based on their role as a guest at the school. For instance, the internet sites may be filtered and the guest's phone may be placed in silent mode while the guest is within the building. Each guest credential may have a limited use period to discourage the use of such credentials by students.

While several examples have been given regarding the use of the system 100 for regulating use of a mobile computing device for a user at a selected location, it is not limited to the use of classroom or meeting environments. For instance, a movie theater or a play house can release an application for use on mobile computing devices. The application can include the ability to purchase tickets. The application can include the client side functionality module 108. When a user purchases a ticket using the application, the client side functionality module can be configured to set the user's mobile computing device 104 with predetermined limitations, such as setting the device's speaker on mute or setting the device to a vibrate only mode when the user is at the theater during the time period of the play, movie, or other type of public or private event. The location identification module 102 can determine when the mobile computing device is located at the theater, playhouse, or other type of location based on GPS location, triangulation information, connection to a selected wireless server device at the location, and so forth.

Even if a user has not purchased a ticket, the client side functionality module 108 can determine when the mobile computing device 104 is at the predetermined location. When this occurs, the client side functionality module can be configured to proactively request the user to identify the movie or other type of event the user is going to attend. The list of events can be provided by the server side functionality module 112. When the user identifies the event, the client side functionality module can be configured to apply the predetermined limitations during the duration of the event. For instance, a user can identify that she will be seeing the movie "Gone with the Wind" while at the theater. The client side functionality module can communicate with the server side functionality module to identify the location of the movie (i.e. theater 14) and the time (i.e. from 4:00-6:30). The client side functionality module can then apply the predetermined limitations to the user's phone when it is identified as being in or near theater 14 from 4:00 to 6:30.

Accordingly, the user can use his or her mobile computing device 104 normally at the location until the event, such as a movie or play, begins. The predetermined limitations can then be applied to the mobile computing device. If the user leaves the theater, or other defined area, then the predetermined limitations can automatically be removed. In addition, when the show or event is over then the predetermined limitations can be removed.

The client side functionality module 108 can provide usage statistics for all authorized users that have downloaded the module. For instance, what web sites were accessed, what applications are run, and so forth. The use statistics can be used to monitor whether additional restrictions need to be applied. For instance, if a new website becomes popular that was not previously blocked, it may be necessary to block the new website during class or work time. Selected features can be blocked, such as incoming and outgoing calls, texting, games, selected internet sites, and so forth. Other features, such as a calculator, authorized internet sites, calendar, task list, camera, e-reader, and so forth can be allowed.

Figure 2:
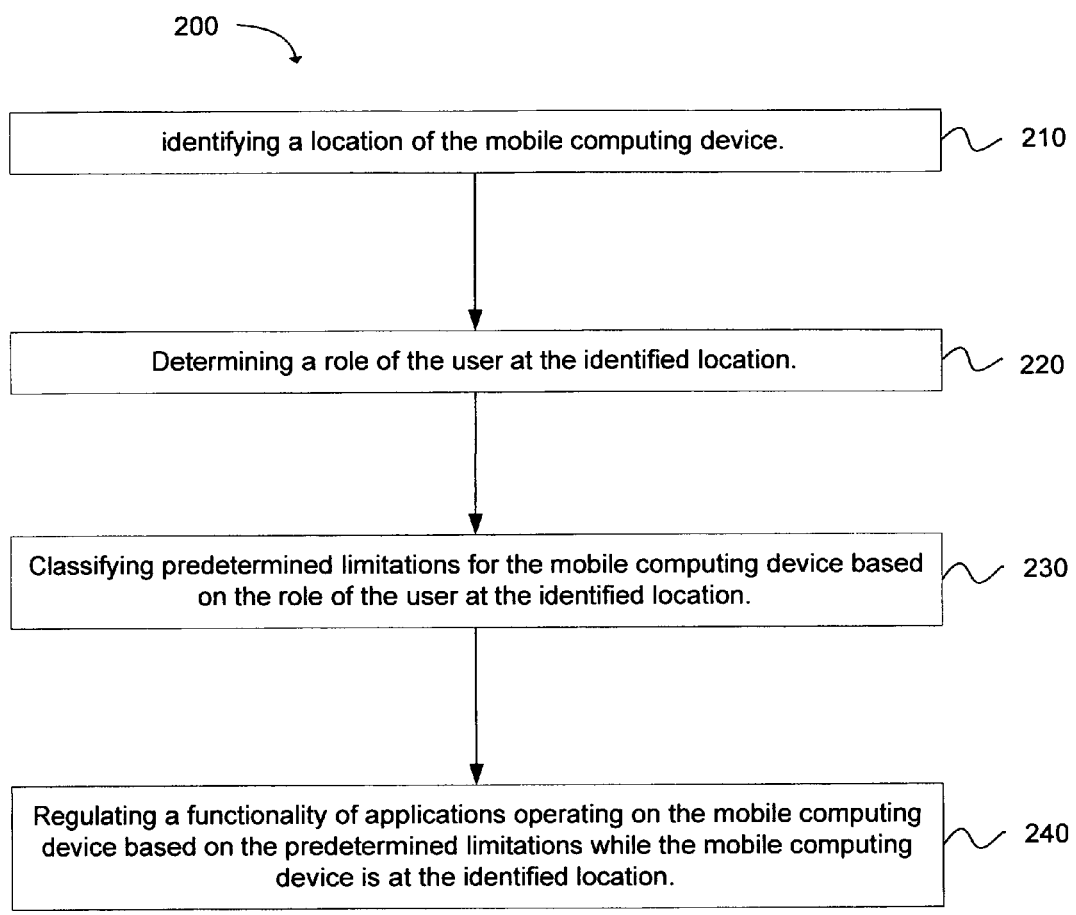
FIG. 2 depicts a flow chart of a method for regulating use of a mobile computing device for a user at a selected location in accordance with an embodiment of the present invention.

In another embodiment, a method 200 for regulating use of a mobile computing device for a user at a selected location is disclosed, as depicted in the flow chart of FIG. 2. The method includes the operation 210 of identifying a location of the mobile computing device. A role of the user at the identified location 220 is identified. Predetermined limitations are classified 230 for the mobile computing device based on the role of the user at the identified location. A functionality of applications operating on the mobile computing device is regulated 240 based on the predetermined limitations while the mobile computing device is at the identified location.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for regulating use of a mobile computing device for a user at a selected location, comprising:
    identifying a location of the mobile computing device;
    determining a first role of the user at the identified location;
    classifying predetermined limitations for the mobile computing device based on the first role of the user at the identified location, classifying based on an associated between the first role and a second role;
    regulating a functionality of applications operating on the mobile computing device based on the predetermined limitations while the mobile computing device is at the identified location; and enabling a member of the first role to alter the predetermined limitations for a group of users in a second role.

2. The method of claim 1, wherein identifying the location of the mobile computing device further comprises identifying the location using at least one of global positioning satellites, radio frequency triangulation using cellular towers, and a connection of the mobile computing device with a wireless routing device located at a predetermined site within the identified location.

3. The method of claim 1, wherein identifying the location of the mobile computing device further comprises identifying the location based on a location of the user.

4. The method of claim 1, further comprising providing distinct limitations for the mobile computing device for different areas within the predetermined location.

5. The method of claim 1, wherein determining a role of the user further comprises registering with a user database and determining the role of the user based on information in the user database.

6. The method of claim 5, further comprising registering a client side functionality module with a server side functionality module operating on a computer server that is in communication with the user database.

7. The method of claim 6, further comprising providing credentials to the computer server to perform the registration of the mobile computing device, wherein the credentials identify a user as belonging to a selected rote.

8. The method of claim 1, further comprising determining a time of day and regulating the functionality of applications operating on the mobile computing device based on the time of day at the identified location.

9. A system for regulating use of a mobile computing device for a user at a selected location, comprising:
  a location identification module configured to identify a location of a mobile computing device;
  a user database operating on a server in communication with the mobile computing device, wherein the user database is configured to identify a first role of the user of the mobile computing device and each role is assigned selected permissions;
  a server side functionality module configured to operate on the server in communication with the mobile computing device, wherein the server side functionality module is configured to store a set of limitations for the mobile computing device based on the location of the mobile computing device and the role of the user; and
  a client side functionality module configured to operate on the mobile computing device that is configured to regulate a functionality of the mobile computing device based on the set of limitations,
  wherein the client side functionality module is further configured to enable the user to alter the set of limitations for the mobile computing devices of a group of users for a selected time limit at a selected location when the role of the user provides the selected permissions.

10. The system of claim 9, further comprising a credentials server to verify the role of the user using predetermined credentials provided to the user.

11. A computer product, comprising a non-transitory computer usable medium having a computer readable program code embodied therein, said computer readable program code adapted to be executed to implement a method for regulating use of a mobile computing device for a user at a selected location, comprising:
  identifying a location of the mobile computing device;
  determining a first role of the user at the identified location;
  classifying predetermined limitations for the mobile computing device based on the role of the user at the identified location, wherein the classifying is based on an association between the first role and a second role;
  regulating a functionality of applications operating on the mobile computing device based on the predetermined limitations while the mobile computing device is at the identified location; and
  enabling a member of the first role to alter the predetermined limitations for a group of users in the second role.

12. The computer product of claim 11, wherein identifying the location of the mobile computing device further comprises identifying the location using at least one of global positioning satellites, radio frequency triangulation using cellular towers, and a connection of the mobile computing device with a wireless routing device located at a predetermined site within the identified location.

13. The computer product of claim 11, further comprising providing distinct limitations for the mobile computing device for different areas within the predetermined location.

14. The computer product of claim 11, wherein determining a role of the user further comprises registering with a user database and determining the role of the user based on information in the user database.

15. The computer product of claim 14, further comprising registering a client side functionality module with a server side functionality module operating on a computer server that is in communication with the user database.

16. The computer product of claim 15, further comprising providing credentials to the computer server to perform the registration of the mobile computing device, wherein the credentials identify a user as belonging to a selected role.

17. The computer product of claim 11, further comprising determining a time of day and regulating the functionality of applications operating on the mobile computing device based on the time of day at the identified location.

* * * * *